Jan. 8, 1957  H. DAVIS  2,776,847
TRAILER HITCH
Filed Nov. 23, 1953
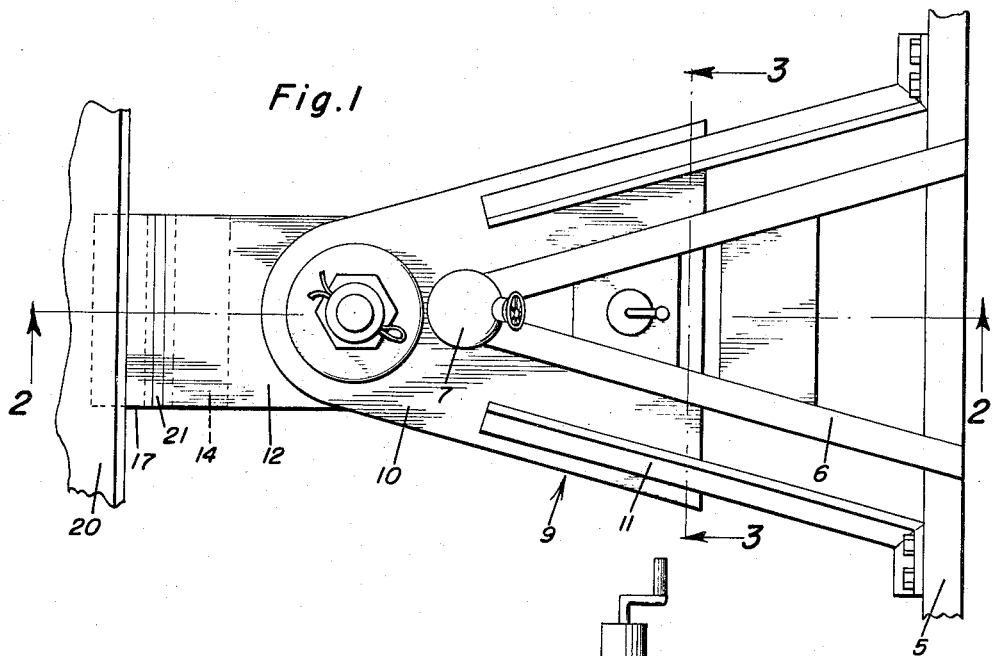
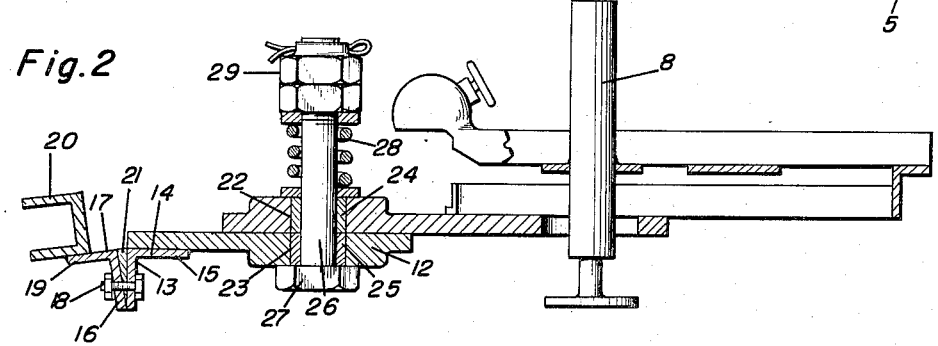
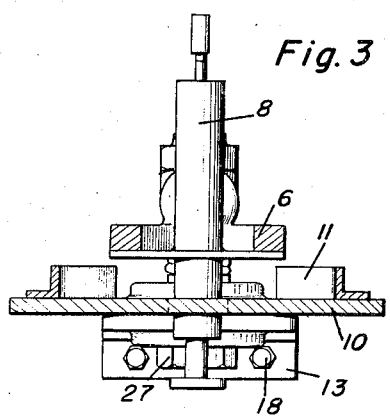
Harry Davis
INVENTOR.

United States Patent Office 2,776,847
Patented Jan. 8, 1957

2,776,847

TRAILER HITCH

Harry Davis, Tallahassee, Fla.

Application November 23, 1953, Serial No. 393,744

2 Claims. (Cl. 280—495)

The present invention relates to new and useful improvements in trailer hitches for use with house trailers.

The average house trailer hitch uses a ball and socket coupling which has proven too weak to safely couple large house trailers and frequently results in breakage of the neck of the ball. Considerable play also occurs between the ball and socket which enables the trailer to sway. Furthermore, the weight of the front end of the trailer resting on the rear end of the towing vehicle tends to lift the front end of the latter and produces a bouncing action which interferes with the control thereof.

Accordingly, it is an object of the present invention to provide a trailer hitch which overcomes the objectional features of the ball and socket coupling and which, at the same time, is strong and durable, easily and quickly attached to and detached from the towing vehicle, relatively inexpensive to manufacture, and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view;

Figure 2 is a longitudinal sectional view taken on a line 2—2 of Figure 1; and

Figure 3 is a transverse sectional view taken on a line 3—3 of Figure 1.

Referring now to the drawing in detail, wherein for the purpose of illustration I have disclosed a preferred embodiment of my invention, the numeral 5 designates the front frame member of a trailer and to which is shown attached the usual V-shaped tongue 6 equipped with a socket 7 for coupling to a ball (not shown) of a trailer coupling. The tongue also provides a support for a jack 8 which supports the front end of the trailer when not being towed.

The present invention comprises a tongue structure designated generally at 9 and which includes a substantially triangular shaped plate 10 to the upper surface of which a pair of angle iron arms 11 are welded to extend rearwardly from the plate in diverging relation to each other and are bolted or otherwise suitably secured at their rear ends to the frame 5.

The front end of plate 10 rests on top of a plate 12 which is welded or otherwise suitably secured to the upper horizontal flange 13 of an angle iron member 14 which has its vertical flange 15 positioned transversely and secured to the vertical flange 16 of a similar angle iron member 17 by bolts and nuts 18. The horizontal flange 19 of angle iron member 17 is welded or otherwise suitably secured to the rear frame member 20 or other suitable part of an automobile or other towing vehicle (not shown).

A wedge 21 is placed between the confronting faces of the vertical flanges 15 and 16 and is secured in position by the bolts and nuts 18 to tend to tilt the front end of the towing vehicle downwardly, in the manner as indicated in Figure 2, to overcome tendency of the weight of the trailer subjected to the rear end of the towing vehicle to lift the front end of the latter.

The front end of plate 10 and the underlying portion of plate 12 are formed with aligned openings 22 and 23 provided with bushings 24 and 25 respectively and in which a coupling pin 26 is received. The pin comprises a bolt having a head 27 at its lower end under the plate 12 and a coil spring 28 is mounted on the upper portion of the bolt and held under tension between the top plate 10 and a nut 29 threaded on the upper end of the bolt.

The coupling pin eliminates play between plates 10 and 12 and spring 28 provides a shock absorber and overcomes tendency to transmit upward movement of trailer tongue 9 to the towing vehicle when the trailer is traveling and conversely to overcome transmission of downward movement of the rear end of the towing vehicle to the trailer. The coil spring also reduces strain subjected to the coupling pin and to the adjacent parts of the hitch caused by tilting of the trailer relative to the towing vehicle and vice versa.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In a trailer hitch for a trailer whose front end is supported by the rear end of a towing vehicle, the combination of a pair of coupled members adapted for attaching to the trailer, one of said members overlying and supported on the other, a pair of vertical flanges positioned transversely of the hitch, one of said flanges being carried by one of said coupling members and the other of said flanges being adapted for attaching to the towing vehicle, means securing said flanges in parallel relation to each other, and a wedge positioned between the flanges subjecting the front end of the towing vehicle to downward pressure.

2. In a trailer hitch for a trailer whose front end is supported by the rear end of a towing vehicle, the combination of a pair of coupled members adapted for attaching to the trailer, one of said members overlying and supported on the other, an angle iron member carried by the underlying coupled member and including a vertical flange, a second angle iron member adapted for attaching at the rear of the towing vehicle and said second angle iron member also including a vertical flange, said first and second vertical flanges being positioned transversely of the hitch, means securing said vertical flanges in confronting relation to each other, and a wedge positioned between the confronting vertical flanges and tending to force the front end of the towing vehicle downwardly.

References Cited in the file of this patent

UNITED STATES PATENTS

| 2,163,999 | Jacks | June 27, 1939 |
| 2,281,555 | Castiglia | May 5, 1942 |
| 2,448,311 | Hill | Aug. 31, 1948 |
| 2,671,673 | Benson | Mar. 9, 1954 |

FOREIGN PATENTS

| 394,675 | France | Jan. 29, 1909 |
| 305,607 | Germany | Aug. 26, 1919 |